United States Patent
Hoehn et al.

(10) Patent No.: US 9,373,237 B1
(45) Date of Patent: Jun. 21, 2016

(54) SECURITY TAG POSITIONING

(71) Applicant: Checkpoint Systems, Inc., Thorofare, NJ (US)

(72) Inventors: Richard Hoehn, Nashville, TN (US); Zachary Cody Hazelwood, Nashville, TN (US); Merril F. Bradshaw, Waxhaw, NC (US); Brian R. Dobeck, Monroe, NC (US)

(73) Assignee: CHECKPOINT SYSTEMS, INC., Thorofare, NJ (US)

( * ) Notice: Subject to any disclaimer, the term of this patent is extended or adjusted under 35 U.S.C. 154(b) by 8 days.

(21) Appl. No.: 14/575,989

(22) Filed: Dec. 18, 2014

(51) Int. Cl.
  *G08B 13/18* (2006.01)
  *G08B 13/24* (2006.01)
(52) U.S. Cl.
  CPC .................... *G08B 13/2462* (2013.01)
(58) Field of Classification Search
  CPC ........... G08B 13/2402; G08B 13/2405; G08B 13/2482
  USPC ................... 340/568.1, 572.1, 572.4
  See application file for complete search history.

(56) References Cited

U.S. PATENT DOCUMENTS

| | | | |
|---|---|---|---|
| 8,786,440 B2 * | 7/2014 | Clare | G01S 13/82 340/572.1 |
| 2011/0316674 A1 * | 12/2011 | Joy | G07G 1/009 340/10.1 |

* cited by examiner

*Primary Examiner* — Kevin Kim
(74) *Attorney, Agent, or Firm* — Nelson Mullins Riley & Scarborough LLP (57) ABSTRACT

A tag controller is configured to interface with a security tag adapted to be disposed on a corresponding product in a monitoring environment. The tag controller includes processing circuitry configured to perform a tag position estimation by receiving information indicative of signal strength measured at the security tag relative to each of a plurality of locating beacons disposed in the monitoring environment, defining an order of a selected number of the locating beacons based on signal strength, determining a first midpoint between two of the selected number of the locating beacons having the lowest signal strengths, determining at least a second midpoint between the first midpoint and a locating beacon having a next lowest signal strength, and determining a location of the security tag at least in part based on the second midpoint.

20 Claims, 7 Drawing Sheets

SECURITY TAG POSITIONING

TECHNICAL FIELD

Various example embodiments relate generally to retail theft deterrent and merchandise protection devices and methods.

BACKGROUND

Security devices have continued to evolve over time to improve the functional capabilities and reduce the cost of such devices. Some security devices are currently provided to be attached to individual products or objects in order to deter or prevent theft of such products or objects. In some cases, the security devices include tags or other such components that can be detected by gate devices at the exit of a retail establishment. These gate devices may be sometimes referred to as towers or pedestals. When the security device passes through or proximate to the gates, an alarm or other notification locally at the product and/or at the gates may be triggered. Additionally, a key may be provided at the point of sale terminal so that the security device can be removed when the corresponding products or objects are purchased.

In order to improve the ability of retailers to deter theft, the security devices and systems in which they operate are continuously being improved. For example, various improvements may be introduced to attempt to improve location accuracy or to carry out certain specific desired functions related to tracking tags and issuing notifications based on the tracking of the tags. However, it may be difficult to determine the appropriate balance of characteristics for a given system.

BRIEF SUMMARY OF SOME EXAMPLES

Some example embodiments may provide tag tracking equipment that can provide for accurate tracking of security tags with a relatively low computational cost. Thus, for example, system functioning may be improved for a lower cost.

In one example embodiment, a tag controller that may be configured to interface with a security tag adapted to be disposed on a product in a monitoring environment is provided. The tag controller may include processing circuitry configured to perform a tag position estimation by receiving information indicative of signal strength measured at the security tag relative to each of a plurality of locating beacons disposed in the monitoring environment, defining an order of a selected number of the locating beacons based on signal strength, determining a first midpoint between two of the selected number of the locating beacons having the lowest signal strengths, determining at least a second midpoint between the first midpoint and a locating beacon having a next lowest signal strength, and determining a location of the security tag at least in part based on the second midpoint.

According to another example embodiment, a security system is provided. The security system may include at least one security tag disposed on a product in a monitoring environment, a plurality of locating beacons associated with a locating system for tracking the security tag in the monitoring environment and a tag controller. The tag controller may include processing circuitry configured to perform a tag position estimation by receiving information indicative of signal strength measured at the security tag relative to each of a plurality of locating beacons disposed in the monitoring environment, defining an order of a selected number of the locating beacons based on signal strength, determining a first midpoint between two of the selected number of the locating beacons having the lowest signal strengths, determining at least a second midpoint between the first midpoint and a locating beacon having a next lowest signal strength, and determining a location of the security tag at least in part based on the second midpoint.

In another example embodiment, a method of performing tag position estimation for a security tag adapted to be disposed on a corresponding product in a monitoring environment is provided. The method may include receiving information indicative of signal strength measured at the security tag relative to each of a plurality of locating beacons disposed in the monitoring environment, defining an order of a selected number of the locating beacons based on signal strength, determining a first midpoint between two of the selected number of the locating beacons having the lowest signal strengths, determining at least a second midpoint between the first midpoint and a locating beacon having a next lowest signal strength, and determining a location of the security tag at least in part based on the second midpoint.

BRIEF DESCRIPTION OF THE SEVERAL VIEWS OF THE DRAWING(S)

Having thus described some example embodiments of the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all embodiments are shown. Indeed, the examples described and pictured herein should not be construed as being limiting as to the scope, applicability or configuration of the present disclosure. Like reference numerals refer to like elements throughout. Furthermore, as used herein, the term "or" is to be interpreted as a logical operator that results in true whenever one or more of its operands are true. As used herein, "operable coupling" should be understood to relate to direct or indirect connection that, in either case, enables at least a functional interconnection of components that are operably coupled to each other.

Some example embodiments may enable provision of a network capable of detecting security devices (e.g., tags) that are attached to objects such as retail products. Furthermore, example embodiments may provide for a tracking system that can simplify the position determining processes employed in the system so that accurate positioning may be accomplished with relatively low computational power. In this regard, for example, example embodiments may identify a subset of locating devices that appear to provide the highest quality position determining capability, and then employ a locating algorithm that greatly simplifies the location determination process, but still provides a relatively accurate locating result. A lighter-weight and potentially cheaper tracking system may therefore be employed while still providing relatively accurate tracking capability. The addition of other functionalities that may be desired may therefore be employed with available resources that would otherwise be consumed by costly calculations associated with position determination.

An example embodiment will be described herein as it relates to a security device (e.g., a tag) that can be attached to an object (e.g., a retail product) and wirelessly communicate with components of an anti-theft asset monitoring network. The network components and the tags may be configured to communicate with each other via any of a number of different communication schemes. Some of these schemes may only monitor for tags in an area proximate to an exit of the retail store being protected. Other schemes may monitor tags throughout the retail store or in various specific zones that may be defined. Furthermore, some embodiments may employ more than one communication scheme simultaneously or in a manner that allows switching between such communication schemes. Since this represents an example of a relatively complex communication paradigm in which an example embodiment is likely to be practiced, an example monitoring environment will be described that employs more than one communication scheme.

Figure 1:
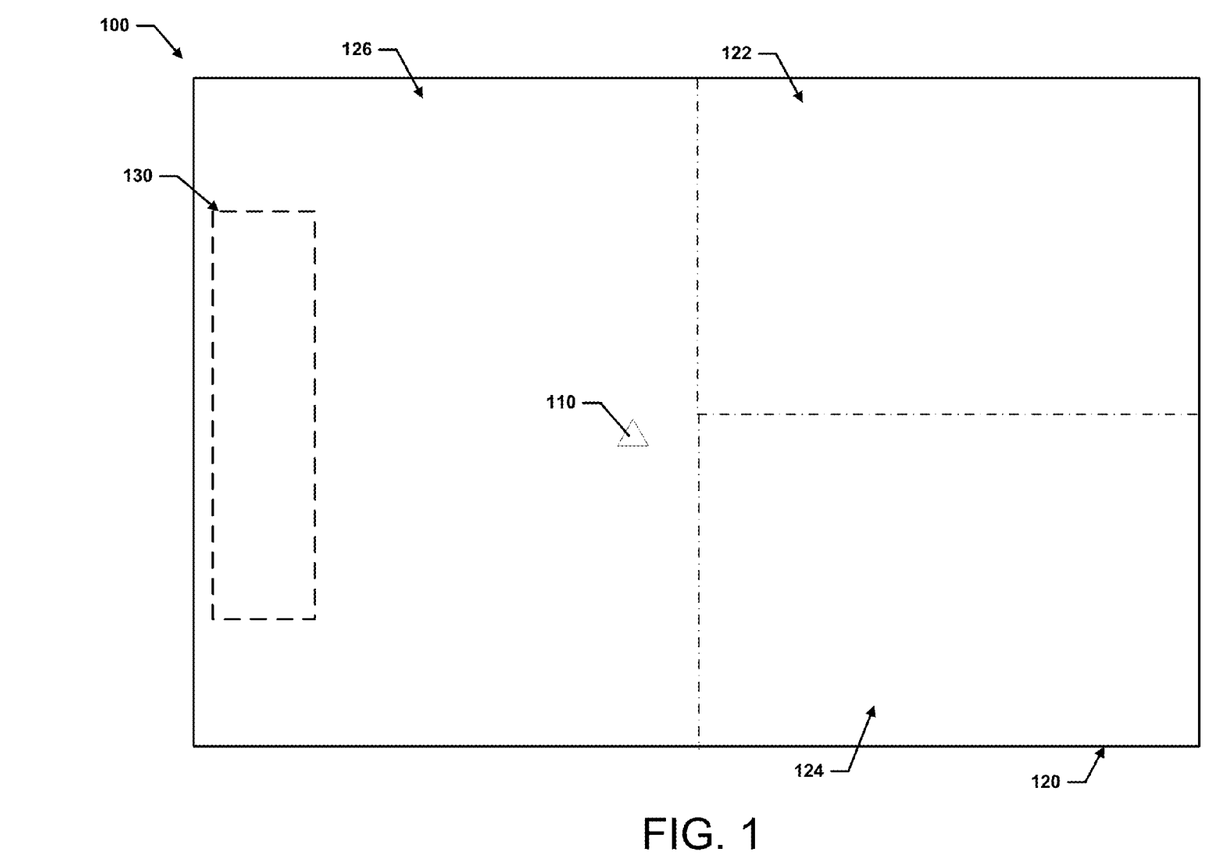
FIG. 1 illustrates a conceptual diagram of a monitoring environment within a retail store according to an example embodiment.
Figure 2:
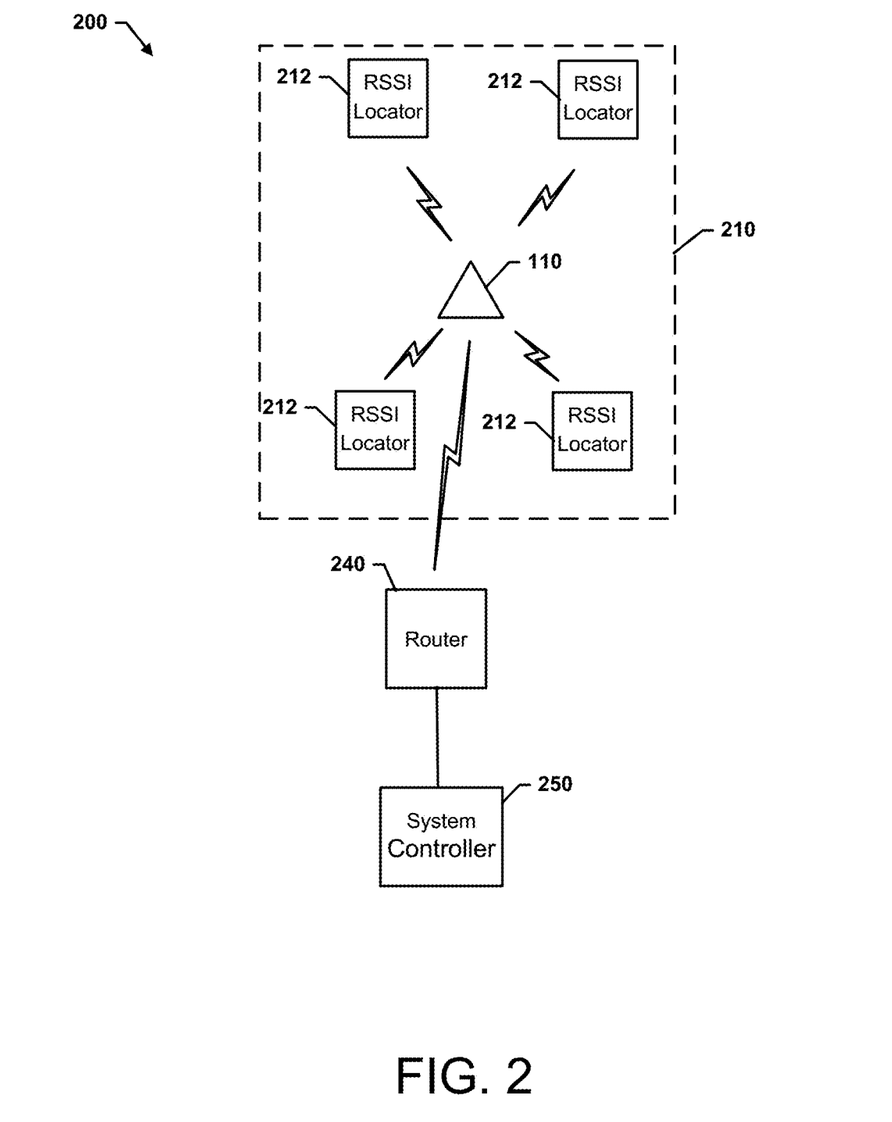
FIG. 2 illustrates a block diagram of a monitoring network that may be employed to monitor tags that may be placed on objects (products) in the monitoring environment in accordance with an example embodiment.

FIG. 1 illustrates a conceptual diagram of a monitoring environment 100 within a retail store. FIG. 2 illustrates a block diagram of a monitoring network 200 that may be employed to monitor tags 110 that may be placed on objects (products) in the monitoring environment 100 in accordance with an example embodiment. As shown in FIG. 1, the monitoring environment 100 may include a first monitoring zone 120 and a second monitoring zone 130. The first monitoring zone 120 may represent a relatively large area of the store (e.g., the sales floor). The second monitoring zone 130 may represent a smaller area of the store and, in some cases, may be proximate to the exit of the store. The first and second monitoring zones 120 and 130 may be exclusively defined or, in some embodiments, the second monitoring zone 130 may exist within and overlap with the first monitoring zone 120.

In some embodiments, the monitoring zones may be further divided into sub-zones. For example, as shown in FIG. 1, the first monitoring zone 120 may be divided into a first sub-zone 122, a second sub-zone 124 and a third sub-zone 126. In some cases, the sub-zones may be correlated with specific departments, locations or product lines within the store. However, the sub-zones could alternatively be defined to divide the monitoring environment 100 into conveniently defined regions to facilitate locating tags 110 within particular regions and detect movement within, out of, or into such regions. In some cases, the sub-zones may be defined at least in part based on proximity to the exit and/or to the second monitoring zone 130. Combinations of the above-described ways of defining sub-zones may also be employed.

The monitoring network 200 may include a locating system 210. The locating system 210 may be a locating system that employs received signal strength indication (RSSI) technology for locating the tags 110. Generally speaking, in the RSSI system (e.g., the locating system 210), the tags 110 may be configured to act as listening devices to receive beacon signals transmitted from RSSI locators 212. Based on the signal strengths of the signals received from each of the RSSI locators 212, the position of the tag 110 relative to the RSSI locators 212 may be determined.

In some cases, the tags 110 may be configured to read or listen for beacon signals transmitted from RSSI locators 212 every 500 msec. Thus, the RSSI sample rate may be half a second. However, the specific details of locating system communication frequencies, sampling rates, and location determination algorithms may change in various different embodiments. Thus, the description above should be appreciated as merely one example implementation that may be employed in some contexts.

In an example embodiment, the number of tags that can be tracked or monitored may depend on the number of samples needed for required or desired accuracy and a desired hit rate for a given operational scenario. Different tracking requirements may be prescribed for various zones, sub-zones and/or the like based on the needs or desires of the retailer. Thus, for example, an alarm zone, an approach zone and other inventory tracking zones may be defined and different sample rates and/or other system characteristics may be defined in each zone. Meanwhile, in each zone, the tags 110 may be trackable using the locating system 210.

In some example embodiments, regardless of the type of systems that are being employed, a tag 110 may be configured to operate in a low power mode where the tag is asleep and wakes up to check in with the network, for example via system controller 250, at relatively large intervals (e.g., every 30 minutes). Movement of the tag 110 (e.g., as detected local to the tag via an accelerometer or jiggle switch) may cause the tag 110 to wake up, leave the low power mode to enter an active mode, and initiate communication with the system controller 250 at shorter intervals such as every half second (e.g., using the 500 msec sample window). According to some example embodiments, the tag 110 may be configured to send a motion start message to the system controller 250 to inform the system controller 250 that the tag has locally detected motion and that the tag will now be communicating at shorter intervals. The system controller 250 may track movement of the tag 110 after the motion start message is received and either update the position of the tag 110 (e.g., on a display or in a database or position log) or perform some other function based on the position of the tag 110 (e.g., inform staff of the tag location, generate an alarm or notification, etc.). When the tag 110 stops moving for a predetermined period of time (e.g., a local timer may be employed that resets in response to actuation of the jiggle switch or the like), a motion end message may be sent to the system controller 250 and, in some cases, the tag 110 may shift back to a low power mode.

As shown in FIG. 2, a plurality of the RSSI locators 212 may be positioned in corresponding zones that are to be monitored using RSSI. For example, the RSSI locators 212 may be positioned at corners or boundaries of the zones. In some example embodiments, the RSSI locators 212 could also be located within zones and the boundaries of the zones may be defined based on a predefined distance from one or more of the RSSI locators 212. The tags 110 may receive transmissions from the RSSI locators 212 and communicate information indicative of a location determined based on signal strength or signal strength data to be used to determine location through a router 240 to a system controller 250. The system controller 250 may, for example, be a computer, server or other terminal that may host software and/or hardware configurable to transform the data indicative of physical location of the tags 110 and the objects to which they are attached into trackable items that may be used to trigger various theft deterrent functions as described herein.

Figure 3:
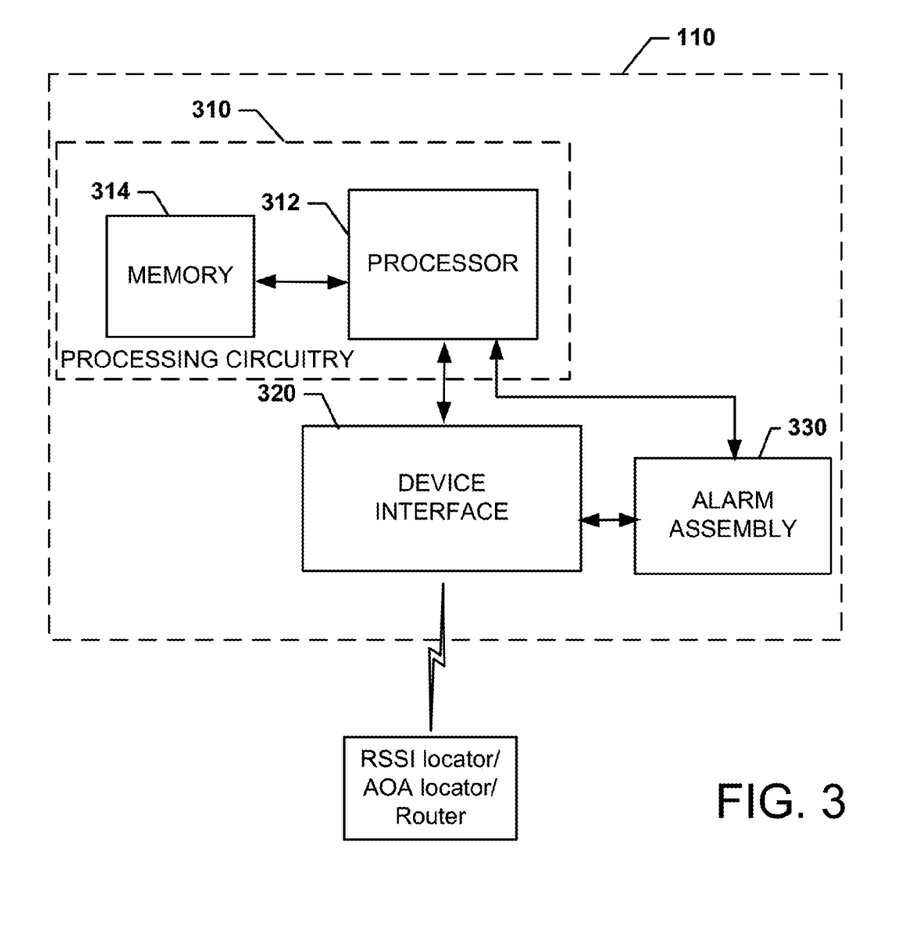
FIG. 3 illustrates a block diagram of a tag according to an example embodiment.

FIG. 3 illustrates a block diagram of tag circuitry in accordance with an example embodiment. As shown in FIG. 3, the tag 110 may include processing circuitry 310 configured in accordance with an example embodiment as described herein. In this regard, for example, the tag 110 may utilize the processing circuitry 310 to provide electronic control inputs to one or more functional units (which may be implemented by or with the assistance of the of the processing circuitry 310) of the tag 110 to receive, transmit and/or process data associated with the one or more functional units and perform communications necessary to enable tracking of tags, issuing of alarms and/or alerts and/or the like as described herein.

In some embodiments, the processing circuitry 310 may be embodied as a chip or chip set. In other words, the processing circuitry 310 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 310 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 310 may include one or more instances of a processor 312 and memory 314 that may be in communication with or otherwise control a device interface 320. As such, the processing circuitry 310 may be embodied as a circuit chip (e.g., an integrated circuit chip) configured (e.g., with hardware, software or a combination of hardware and software) to perform operations described herein.

The device interface 320 may include one or more interface mechanisms for enabling communication with other devices (e.g., RSSI locators 212, routers 240, other tags 110, tag readers, and/or other devices). In some cases, the device interface 320 may be any means such as a device or circuitry embodied in either hardware, or a combination of hardware and software that is configured to receive and/or transmit data from/to devices or components in communication with the processing circuitry 310 via internal and/or external communication mechanisms. Accordingly, for example, the device interface 320 may further include wireless communication equipment (e.g., one or more antennas) for at least communicating with RSSI locators 212, and/or routers 240. The device interface 320 may therefore include one or more antenna arrays that may be configured or configurable to receive and/or transmit properly formatted signals associated with at least the locating system 210. The device interface 320 may further include radio circuitry configured to encode and/or decode, modulate and/or demodulate, or otherwise process wireless signals received by or to be transmitted by the antenna array(s).

In some embodiments, the tag 110 may also include an alarm assembly 330, which may include an audio device (e.g., a piezoelectric, mechanical, or electromechanical beeper, buzzer or other audio signaling device such as an audible alarm). The alarm assembly 330 may include a speaker or other sound generating device that may be provided in a housing of the tag 110. In some example embodiments, the alarm assembly 330 may also include visible indicia (e.g., lights of one or more colors such as a bi-color (e.g., red/green) LED). The visible indicia of the alarm assembly 330 and/or the audio device thereof may be used in various ways to facilitate or enhance operation of the tag 110. For example, different tones, sounds, or music may be played when the tag 110 receives different messages, or is operated in a certain way (e.g., movement into or out of a particular zone, proximity to a gate, passage through the gate, loss of communication with the network, detection of tampering or cutting of wires that affixed the tag 110 to an object, etc.). Similarly, different light colors, light flash sequences or other visible indicia may be provided in combination with or instead of the audible indicia in order to indicate certain conditions (e.g., movement into or out of a particular zone, proximity to a gate, passage through the gate, loss of communication with the network, detection of tampering or cutting of wires that affixed the tag 110 to an object, etc.).

The processor 312 may be embodied in a number of different ways. For example, the processor 312 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 312 may be configured to execute instructions stored in the memory 314 or otherwise accessible to the processor 312. As such, whether configured by hardware or by a combination of hardware and software, the processor 312 may represent a physical entity (e.g., physically embodied in circuitry—in the form of processing circuitry 310) capable of performing operations according to example embodiments while configured accordingly. Thus, for example, when the processor 312 is embodied as an ASIC, FPGA or the like, the processor 312 may be specifically configured hardware for conducting the operations described herein. Alternatively, as another example, when the processor 312 is embodied as an executor of software instructions, the instructions may specifically configure the processor 312 to perform the operations described herein in reference to execution of an example embodiment.

In some examples, the processor 312 (or the processing circuitry 310) may be embodied as, include or otherwise control the operation of the tag 110 based on inputs received by the processing circuitry 310. As such, in some embodiments, the processor 312 (or the processing circuitry 310) may be said to cause each of the operations described in connection with the tag 110 to occur in relation to operation of the tag 110 relative to undertaking the corresponding functionalities associated therewith responsive to execution of instructions or algorithms configuring the processor 312 (or processing circuitry 310) accordingly. In particular, the processor 312 (or processing circuitry 310) may be configured to enable the tag 110 to communicate with the RSSI locators 212, and/or routers 240 to provide information to the system controller 250 that enables the system controller 250 to locate the tag and, in some cases, perform other functions based on the location of the tag 110 or other information about the status of the tag 110 that is determinable from the communications with the tag 110 (or lack thereof).

In an example embodiment, the memory 314 may include one or more non-transitory memory devices such as, for example, volatile and/or non-volatile memory that may be either fixed or removable. The memory 314 may be configured to store information, data, applications, instructions or the like for enabling the processing circuitry 310 to carry out various functions in accordance with example embodiments. For example, the memory 314 may be configured to buffer input data for processing by the processor 312. Additionally or alternatively, the memory 314 may be configured to store instructions for execution by the processor 312. As yet another alternative or additional capability, the memory 314 may include one or more databases that may store a variety of data sets or tables useful for operation of the tag 110. Among the contents of the memory 314, applications or instruction sets may be stored for execution by the processor 312 in order to carry out the functionality associated with each respective application or instruction set. In some cases, the applications/instruction sets may include instructions for carrying out some or all of the operations described in reference to the algorithms or flow charts described herein, including but not limited to those described with respect to FIG. 6. In particular, the memory 314 may store executable instructions that enable the computational power of the processing circuitry 310 to be employed to improve the functioning of the tag 110 relative to the tracking, notifying and alarming functions described herein. As such, the improved operation of the computational components of the tag 110 transforms the tag 110 into a more capable tracking, notifying and alarming device relative to the physical objects to which the tag 110 is attached. Thus, for example, the tag 110 may be transformed into a device that can cooperatively report its location so that the tag 110 is capable of being tracked to support various enhanced or additional functions that may be accomplished at the system controller 250.

Although the tag 110 may be trackable within the locating system 210, it should be appreciated that the tag 110 could be operated entirely within another locating system that employs range measurement technology completely independent of the locating system 210 as well. However, in an example embodiment, only the locating system 210 may be established within the monitoring environment 100. Whether used alone to track the tag 110, or in connection and/or cooperation with another locating system, the locating system 210 may employ certain methods and/or improvements aimed at reducing the computational load on the system without sacrificing accuracy. As such, for example, the system controller 250 may be configured to include one or more components that enable the system controller 250 to perform a position estimation operation or algorithm that allows the tag 110 to be tracked within the locating system 210 with a reduced computational load.

Figure 4:
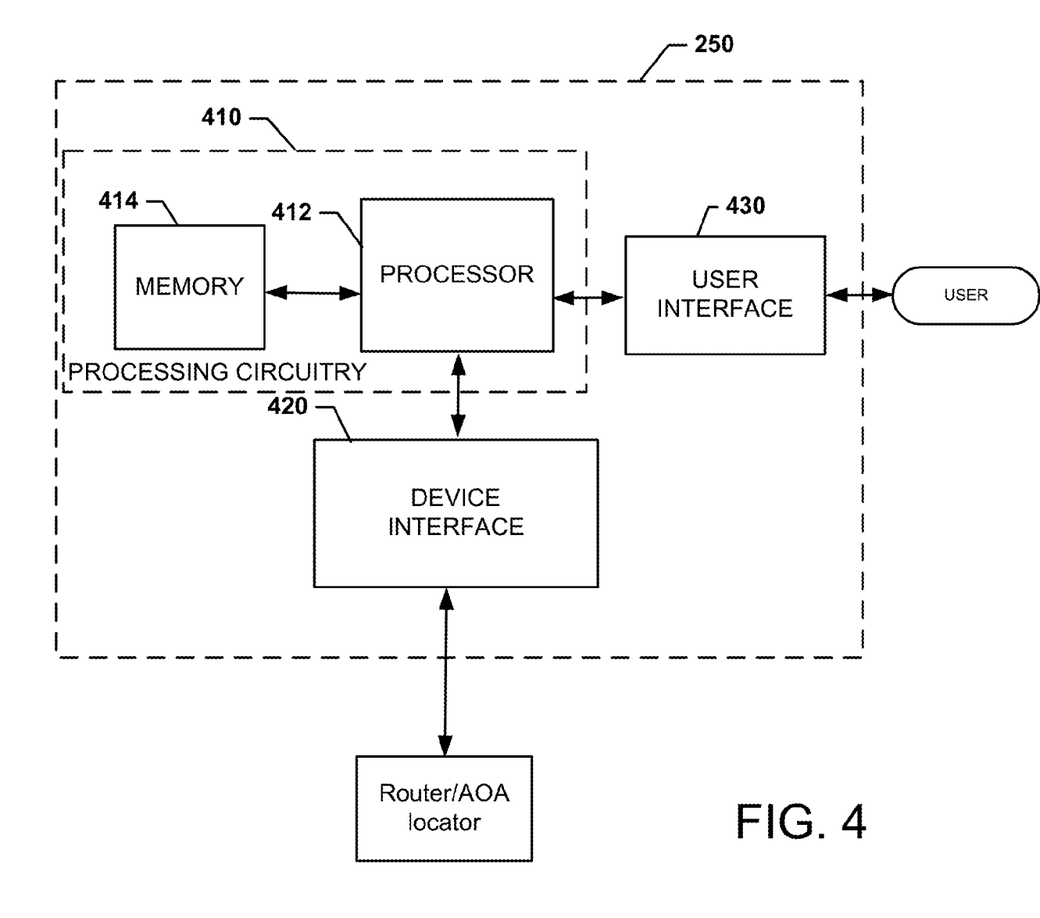
FIG. 4 illustrates a block diagram of a system controller according to an example embodiment.

FIG. 4 illustrates a block diagram of the system controller 250 in accordance with an example embodiment. As shown in FIG. 4, the system controller 250 may include processing circuitry 410 of an example embodiment as described herein. In this regard, for example, the system controller 250 may utilize the processing circuitry 410 to provide electronic control inputs to one or more functional units of the system controller 250 to obtain, transmit and/or process data associated with the one or more functional units and perform the subsequent locating, tracking, notification, and/or alarm functions described herein. The system controller 250 may also initiate and control the processing of tag 110 location information to perform tag position estimation, as described below.

In some embodiments, the processing circuitry 410 may be embodied in physical and functional form in a similar manner to that which has been described above with respect to FIG. 3. However, according to some example embodiments, the processing circuitry 410 may have expanded capabilities with respect to processing speed and communication throughput relative to the processing circuitry utilized by the tag 110.

In an example embodiment, the processing circuitry 410 may include one or more instances of a processor 412 and memory 414 that may be in communication with or otherwise control a device interface 420 and, in some cases, a user interface 430. As such, the processing circuitry 410 may be embodied as a circuit chip (e.g., an integrated circuit chip) configured (e.g., with hardware, software or a combination of hardware and software) to perform operations described herein.

The user interface 430 may be in communication with the processing circuitry 410 to receive an indication of a user input at the user interface 430 and/or to provide an audible, visual, tactile or other output to the user. As such, the user interface 430 may include, for example, a touch screen, one or more switches, buttons or keys (e.g., function buttons), mouse, joystick, keyboard, and/or other input mechanisms. In an example embodiment, the user interface 430 may include one or a plurality of lights, a display, a speaker, a tone generator, a vibration unit and/or the like as potential output mechanisms.

The device interface 420 may include one or more interface mechanisms for enabling communication with other devices (e.g., routers 240 and/or external network devices). In some cases, the device interface 420 may be any means such as a device or circuitry embodied in either hardware, or a combination of hardware and software that is configured to receive and/or transmit data from/to devices or components in communication with the processing circuitry 410 via internal and/or external communication mechanisms. Accordingly, for example, the device interface 420 may further include Ethernet connections and/or wireless communication equipment for at least communicating with the routers 240.

The processor 412 may be embodied in a number of different ways. For example, the processor 412 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 412 may be configured to execute instructions stored in the memory 414 or otherwise accessible to the processor 412. As such, whether configured by hardware or by a combination of hardware and software, the processor 412 may represent an entity (e.g., physically embodied in circuitry—in the form of processing circuitry 410) capable of performing operations according to embodiments of the present invention while configured accordingly. Thus, for example, when the processor 412 is embodied as an ASIC, FPGA or the like, the processor 412 may be specifically configured hardware for conducting the operations described herein. Alternatively, as another example, when the processor 412 is embodied as an executor of software instructions, the instructions may specifically configure the processor 412 to perform the operations described herein in reference to execution of an example embodiment.

In some examples, the processor 412 (or the processing circuitry 410) may be embodied as, include or otherwise control the operation of the system controller 250 based on inputs received by the processing circuitry 410. As such, in some embodiments, the processor 412 (or the processing circuitry 410) may be said to cause each of the operations described in connection with the system controller 250 in relation to operation of the system controller 250 relative to undertaking the corresponding functionalities associated therewith responsive to execution of instructions or algorithms configuring the processor 412 (or processing circuitry 410) accordingly. In particular, the processor 412 (or processing circuitry 410) may be configured to enable the system controller 250 to communicate with the RSSI locators 212, and/or routers 240 to provide information to the system controller 250 that enables the system controller 250 to locate the tag 110 and, in some cases, perform other functions based on the location of the tag 110 or other information about the status of the tag 110 that is determinable from the communications with the tag 110 (or lack thereof).

In an exemplary embodiment, the memory 414 may include one or more non-transitory memory devices such as, for example, volatile and/or non-volatile memory that may be either fixed or removable. The memory 414 may be configured to store information, data, applications, instructions or the like for enabling the processing circuitry 410 to carry out various functions in accordance with exemplary embodiments of the present invention. For example, the memory 414 could be configured to buffer input data for processing by the processor 412. Additionally or alternatively, the memory 414 could be configured to store instructions for execution by the processor 412. As yet another alternative or additional capability, the memory 414 may include one or more databases that may store a variety of data sets or tables useful for operation of the system controller 250. Among the contents of the memory 414, applications or instruction sets may be stored for execution by the processor 412 in order to carry out the functionality associated with each respective application or instruction set. In some cases, the applications/instruction sets may include instructions for carrying out some or all of the operations described in reference to the algorithms or flow charts described herein. In particular, the memory 414 may store executable instructions that enable the computational power of the processing circuitry 410 to be employed to improve the functioning of the system controller 250 relative to the tracking, notifying and alarming functions described herein. As such, the improved operation of the computational components of the system controller 250 transforms the system controller 250 into a more capable tracking, notifying and alarming device relative to the physical objects to which the tag 110 is attached. The processing circuitry 410 may therefore be configured, e.g., by instruction execution, to receive signals from the tags (e.g., via the locators and/or the router 240) and transform attributes of the received signals into data describing the location of the tags 110 for presentation to a user on a terminal or to trigger other functionalities of the system. The processing circuitry 410 may also transform information indicative of the location of the tag 110 into functional inputs that can be used to perform a position estimation operation or algorithm as described herein. When operating in this capacity, the processing circuitry 410 may act as a tag controller for the system controller 250.

The tag controller may therefore be any means or device embodied in hardware, software or a combination of hardware and software that may be configured to direct operation of the system controller 250 at least with respect to the processing of location information received from the tag 110 to estimate tag position accurately and quickly, with little computational load. The tag controller may therefore be controlled by the processing circuitry 410 or even may be embodied by the processing circuitry 410. In any case, the processing circuitry 410 may be said to cause the operations of the tag controller at least with respect to performing tag position estimation.

In an example embodiment, the tag controller may be configured to receive information from the tag 110 indicative of the beacons (e.g., RSSI locators 212) from which the tag 110 is receiving beacon signals (e.g., via 802.15.4 or other communication protocols). As the tag 110 listens for beacon signals in assigned timeslots, the tag 110 reports information indicative of the identity of each RSSI locator 212 from which a signal is received, and a corresponding indication of the signal strength of each such signal. Thus, for example, the tag 110 may report the ID of each RSSI locator 212 and its corresponding RSSI signal strength. However, in some cases, the tag 110 need not report every RSSI locator 212 detected. Instead, for example, the tag 110 may only report a predetermined or selected number of such information. In some cases, the tag 110 may report only the IDs of the locators having the highest strength. Thus, for example, the top three, top five, or top n beacon signal strengths and corresponding IDs may be reported. This information may collectively be referred to as information indicative of signal strength of a selected number of locating beacons.

When the processing circuitry 410 (e.g., the tag controller) receives the information indicative of signal strength measured at the tag 110 relative to the locating beacons (e.g., RSSI locators 212), the processing circuitry 410 may be further configured to perform for further complete tag position estimation. In this regard, for example, the tag position estimation may further include ordering the IDs (or other indicators) by signal strength (e.g., highest to lowest). Once the selected number of the locating beacons has been ordered based on signal strength, information associated with known geometric and/or distance information about the location of the locating beacons may be employed to simplify the computational loading associated with performing position estimation.

The ordering of the measured signal strength information may be defined generally based on signal strength alone, if all measurements considered are generally taken at the same time. However, if the timing of such measurements is different, then defining the order may include weighting for each locating beacon according to a ratio of signal strength and time received. Highest strength and most recently received signals may be weighted highest.

Figure 5:
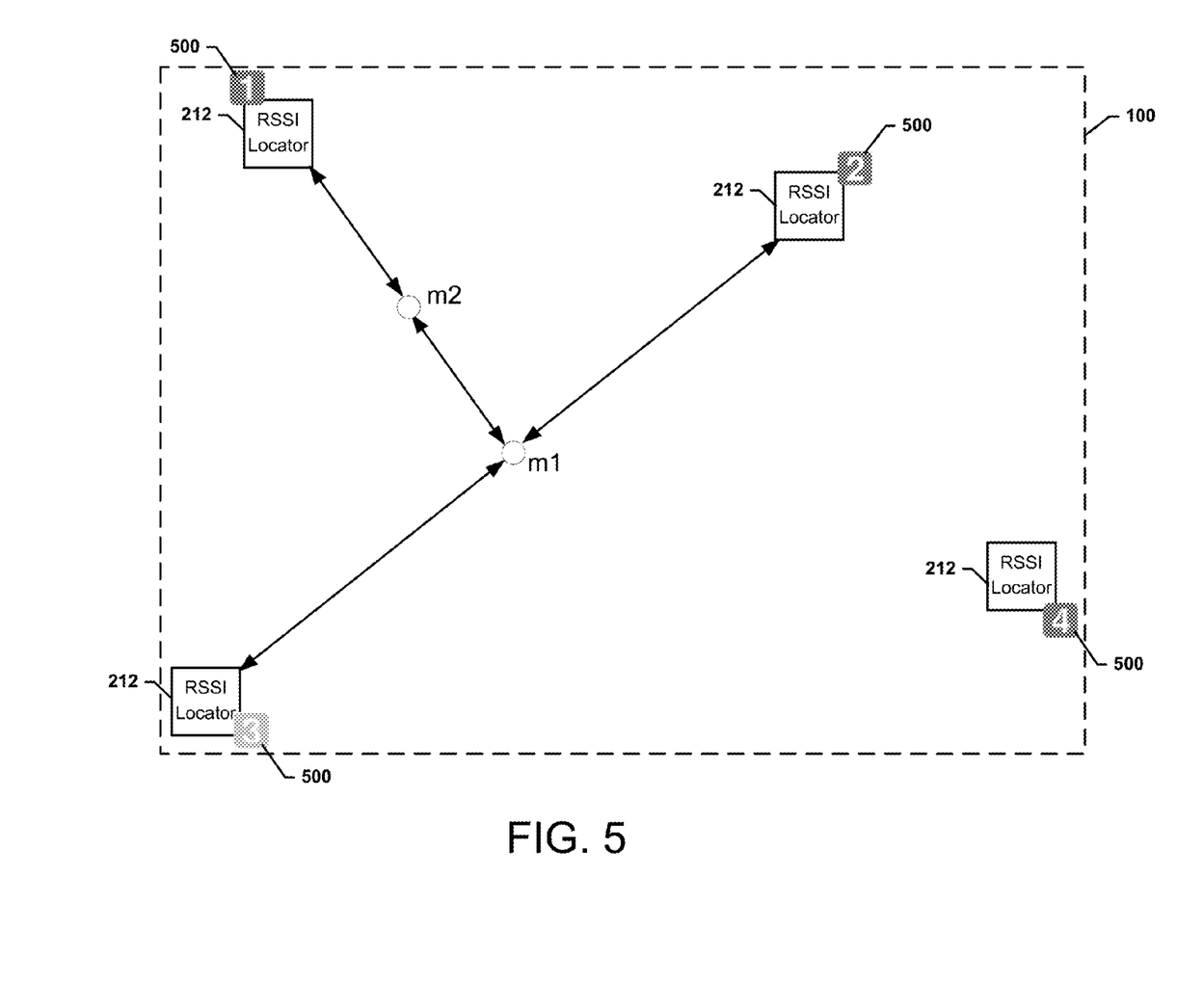
FIG. 5 illustrates a top plan view of a monitoring environment in which midpoint calculations may be performed to estimate tag position in accordance with an example embodiment.

FIG. 5 illustrates an example of how known locations of locating beacons can be used to simplify tag position estimation. As shown in FIG. 5, the RSSI locators 212, which act as locating beacons, may be provided at various locations within the monitoring environment 100. The locating beacons are provided with a ranking number 500 to indicate the top three weighted signal strengths reported by the tag (e.g., based on signal strength and/or time received). If the selected number of locating beacons is three (i.e., n=3), then only the information associated with the highest three beacon signal strengths may be considered in performing the tag position estimation. The tag position estimation may then proceed with a series of midpoint estimations associated with the selected locating beacons. In this regard, for example, the tag position estimation may include determining a first midpoint (m1) between two of the selected number of the locating beacons having the lowest signal strengths. In this case, the first midpoint (m1) is located midway between the locating beacons having the second and third ranked signal strengths. After the first midpoint (m1) is determined, then a second midpoint (m2) may be determined midway between the first midpoint (m1) and a locating beacon having a next lowest signal strength (which in this case, since n=3, happens to be the locating beacon with the highest signal strength). To the extent that more locating beacons are considered, the operations above can be repeated with each subsequent next lowest (i.e., higher) signal strength, until m=n−1 midpoints have been calculated. The location of the tag may be estimated as the location of the last midpoint (i.e., n−$1^{th}$ midpoint).

In some cases, the operations above can be repeated for any selected number of locating beacons. Thus, for example, if the method were to be continued for yet further locating beacons, after determining the second midpoint (m2), then a loop procedure may be completed until the last midpoint is determined. For the loop procedure, m may be equal to the number of the midpoint being calculated. Thus, for continuation of the example above, initially at least, m=3. The loop procedure may thus include determining an $m^{th}$ midpoint (m3) between the m-$1^{th}$ midpoint (i.e., second midpoint (m2) in this example) and a locating beacon having a next lowest signal strength. If m<n-1, then m is incremented by 1 and the loop procedure is repeated until m=n-1. In response to m=n-1, then the location of the security tag is estimated as the n-$1^{th}$ midpoint.

By performing the tag position estimation process described above, it should be appreciated that the estimated location is weighted toward the location of the strongest signal strength reported. The weakest signal strengths considered are used for the first (and lowest weighted) midpoint calculation, and each subsequent midpoint calculated is weighted a bit higher than the preceding calculation by this method. Thus, each time the tag estimation process is performed, a location estimation results that is generally weighted toward the strongest received signals. However, it should be appreciated that various conditions may impact the signal strength received from each of the locating beacons when the process is repeated over a number of cycles. For example, if the process is performed while the tag or other objects around the tag are moving, some signals may be temporarily blocked by the movement of the objects. Thus, some signal strengths may temporarily increase or decrease. To account for these temporary changes, and to smooth over such changes, the positions may be averaged over a given number of cycles to determine tag position. For example, the tag position estimation processes described above may be repeated at least x number of times, and each position determined may be stored. Then a predetermined number of such determined locations (e.g., the most recent x determined locations) may be averaged together to determine the location. In some cases, the value x may depend on whether the tag is apparently moving or not. Thus, for example, if the tag is moving, the rate of measuring and the number of values averaged may be adjusted to improve system performance.

In an example in which only a single floor of a store forms the monitoring environment 100, there should be no need to worry about tags receiving signals from other floors. However, in a multi-floor environment, it is possible that cross-floor communication between tags and locating beacons may occur. To deal with such situations, the processing circuitry 410 may be further configured to perform floor disambiguation in response to a determination that the security tag is being simultaneously tracked on more than one floor. In such a case, if the tag reports locating beacon IDs for beacons on other floors, then the floor disambiguation may be required. In some cases, the floor disambiguation may be accomplished by comparing weights of locating beacons and differentiating between floors based on a floor having a highest locating beacon weight (or average weight). Once the correct floor is determined, all data associated with locating beacons from other floors may be discarded and/or ignored.

In some cases, the tag controller may be configured to execute the operations described above instead of trying to trilaterate a position when using a relatively noisy beacon signaling source (e.g., RSSI). By using the tag position estimation described herein, the number of samples needed to obtain an accurate position may be significantly reduced. Additionally, by employing the smoothing techniques described herein, data filtering need not be aggressively performed since the positions will always be bounded by the known XY positions of the locator beacons. Thus, a fast, accurate and low cost system can be implemented and battery power in the tags may be conserved since fewer samples are required.

Figure 6:
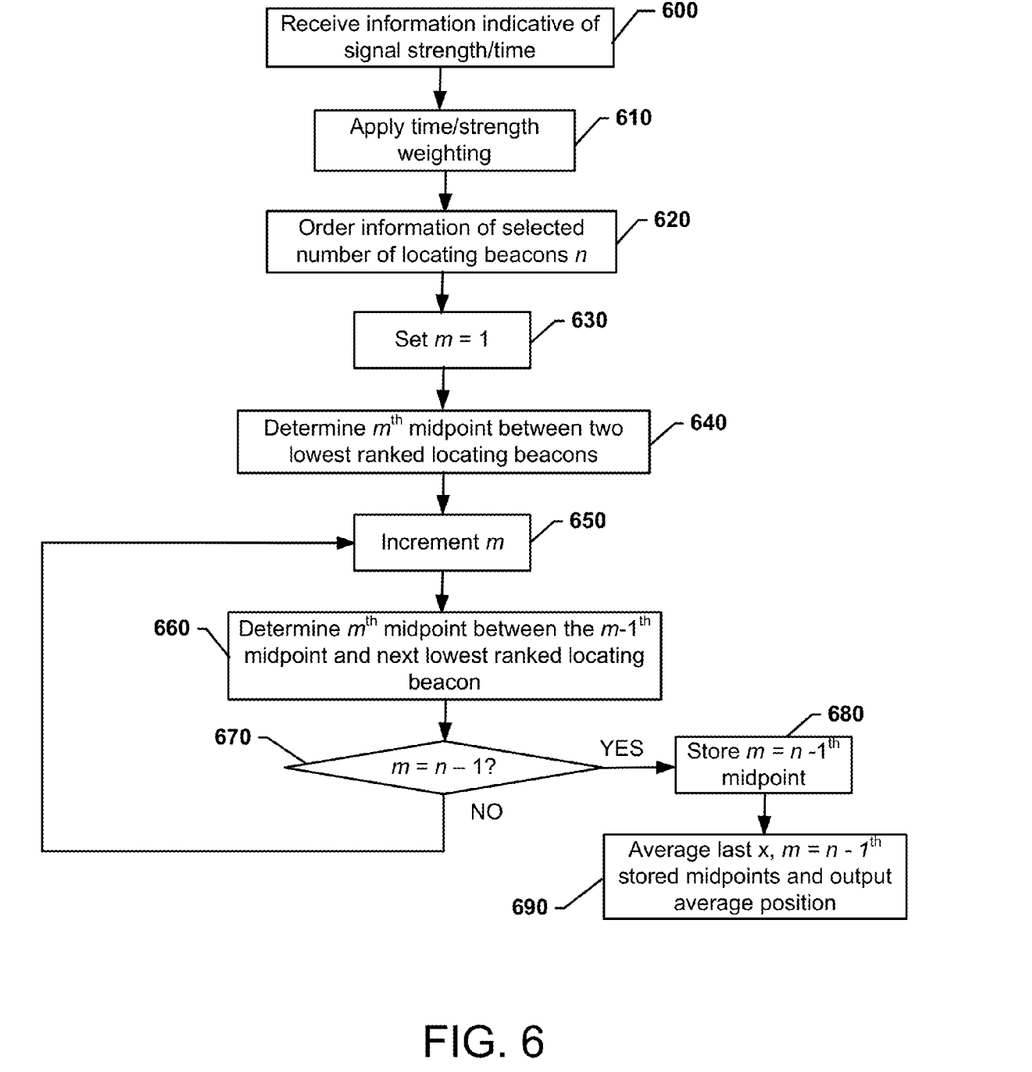
FIG. 6 illustrates a block diagram showing a control flow representative of an algorithm executable at a tag controller in accordance with an example embodiment.
Figure 7:
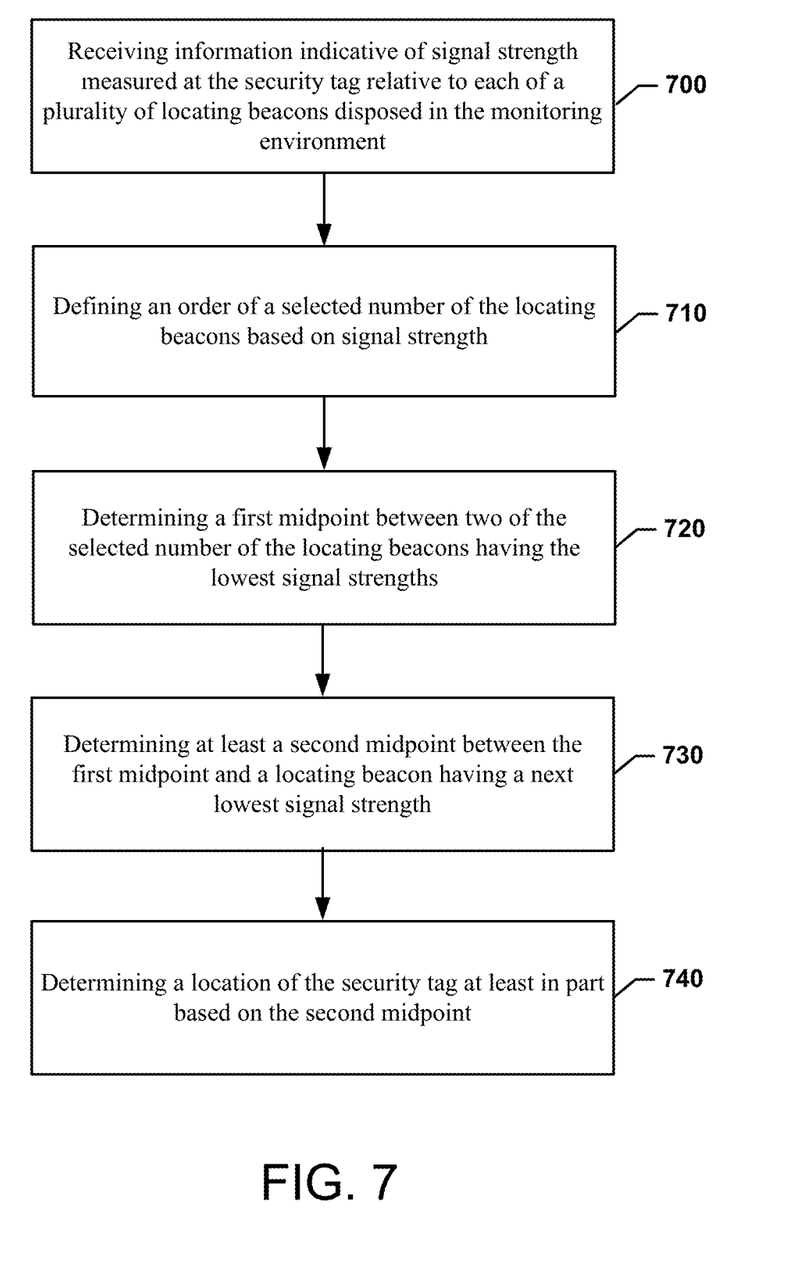
FIG. 7 illustrates a block diagram of a method of determining when a tag in a monitoring system should be grouped in accordance with an example embodiment.

In an example embodiment, the system controller 250 and/or tag controller may therefore be configured to receive information indicative of the signal strength and time that beacon signals are received by the tag. The tag controller may then determine tag location by employing the position estimation processes described herein. Thus, from a technical perspective, the tag controller embodied at the system controller 250, as described above, may be used to support some or all of the operations described above. As such, the platforms described in FIGS. 1-5 may be used to facilitate the implementation of several computer program and/or network communication based interactions. As an example, FIGS. 6 and 7 are flowcharts of example methods and program products according to an example embodiment. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a computing device and executed by a processor in the computing device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, FIG. 6 illustrates a block diagram showing a control flow representative of an algorithm executable at the tag controller (e.g., by processing circuitry 410 at the system controller 250) in accordance with an example embodiment. As shown in FIG. 6, the processing circuitry 410 may initially receive information indicative of signal strength and/or time received at the tag at operation 600. Any time/strength weighting may then be applied at operation 610. The received values for each locating beacon may then be ranked or ordered for a selected number (i.e., n) of locating beacons at operation 620. At operation 630, m may be set to 1 and then an $m^{th}$ midpoint may be determined between two lowest ranged locating beacons at operation 640. The value of m may then be incremented by one at operation 650. Thereafter, at operation 660, the $m^{th}$ midpoint between the $m-1^{th}$ midpoint and the next lowest ranked locating beacon may be determined. A determination may then be made as to whether m=n-1 at operation 670. If m does not equal n-1, then flow is returned to operation 650 and operations 660 and 670 are repeated. However, once the operations 650 to 670 (which may be referred to as a loop procedure) have been completed enough times so that m=n-1, then the last determined midpoint (i.e., the m=n-1$^{th}$ midpoint) is stored at operation 680. The last x midpoints are then averaged to determine an average position for the stored midpoints, which averaged value is used as the tag position according to the tag position estimation of an example embodiment.

FIG. 7 illustrates a block diagram of a method of performing tag position estimation with security devices in accordance with an example embodiment. The security devices or tags may each be associated with corresponding products (e.g., retail items) in a monitoring environment. The method may be executed by a tag controller that may be configured to interface with the security tags. The tag controller may include processing circuitry configured to perform the method of FIG. 7. The method may include receiving information indicative of signal strength measured at the security tag relative to each of a plurality of locating beacons disposed in the monitoring environment at operation 700 and defining an order of a selected number of the locating beacons based on signal strength at operation 710. The method may further include determining a first midpoint between two of the selected number of the locating beacons having the lowest signal strengths at operation 720, determining at least a second midpoint between the first midpoint and a locating beacon having a next lowest signal strength at operation 730, and determining a location of the security tag at least in part based on the second midpoint at operation 740.

In some embodiments, the features described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, If the selected number of the locating beacons is n, and n>3, then the method may include, after determining the second midpoint, setting m=3 and performing a loop procedure. The loop procedure may include determining a $m^{th}$ midpoint between the $m-1^{th}$ midpoint and a locating beacon having a next lowest signal strength. If m<n-1, m may be incremented by 1 and the loop procedure may be repeated until m=n-1. However, if m=n-1, then the location of the security tag may be determined as the m=n-1$^{th}$ midpoint. In an example embodiment, the m=n-1$^{th}$ midpoint may be stored and the last x such midpoints may be averaged to determine the tag location. In some cases, time/strength weighting may be applied and/or floor disambiguation may also be performed.

Example embodiments may provide a security device that can effectively protect a product to which it is attached from theft, while enabling the position of the tag on the product to be determined quickly and accurately, without a large computational overhead. By enabling the security device to be tracked using fewer computational and power resources, effectiveness may be increased while overall cost to a retailer using instances of the security device to protect products may be reduced.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A tag controller configured to interface with a security tag adapted to be disposed on a corresponding product in a monitoring environment, the tag controller comprising processing circuitry configured to perform a tag position estimation comprising:
   receiving information indicative of signal strength measured at the security tag relative to each of a plurality of locating beacons disposed in the monitoring environment;
   defining an order of a selected number of the locating beacons based on signal strength;
   determining a first midpoint between two of the selected number of the locating beacons having the lowest signal strengths;
   determining at least a second midpoint between the first midpoint and a locating beacon having a next lowest signal strength; and
   determining a location of the security tag at least in part based on the second midpoint.

2. The tag controller of claim 1, wherein determining the location of the security tag comprises determining the location of the security tag as the second midpoint in response to the selected number of the locating beacons being three.

3. The tag controller of claim 1, wherein, in response to the selected number of the locating beacons being n, where n>3, determining the location of the security tag further comprises:
   after determining the second midpoint, setting m=3 and performing a loop procedure, the loop procedure comprising determining a $m^{th}$ midpoint between the $m-1^{th}$ midpoint and a locating beacon having a next lowest signal strength,
   if m<n-1, incrementing m by 1 and repeating the loop procedure until m=n-1,
   in response to m=n-1, determining the location of the security tag as the n-1$^{th}$ midpoint.

4. The tag controller of claim 1, wherein the processing circuitry is further configured to:
  repeat the tag position estimation at least x number of times;
  store x most recent determined locations of the security tag comprises; and
  determine an average tag position as an average of the x most recent determined locations.

5. The tag controller of claim 1, wherein defining the order further comprises weighting each locating beacon according to a ratio of signal strength and time received.

6. The tag controller of claim 5, wherein the processing circuitry is further configured to perform floor disambiguation in response to a determination that the security tag is being simultaneously tracked on more than one floor.

7. The tag controller of claim 6, wherein the floor disambiguation comprises comparing weights of locating beacons and differentiating between floors based on a floor having a highest locating beacon weight.

8. The tag controller of claim 1, wherein the signal strength is RSSI.

9. A security system comprising:
  at least one security tag disposed on a product in a monitoring environment;
  a plurality of locating beacons associated with a locating system for tracking the security tag in the monitoring environment; and
  a tag controller comprising processing circuitry configured to perform a tag position estimation comprising:
    receiving information indicative of signal strength measured at the security tag relative to each of a plurality of locating beacons disposed in the monitoring environment;
    defining an order of a selected number of the locating beacons based on signal strength;
    determining a first midpoint between two of the selected number of the locating beacons having the lowest signal strengths;
    determining at least a second midpoint between the first midpoint and a locating beacon having a next lowest signal strength; and
    determining a location of the security tag at least in part based on the second midpoint.

10. The security system of claim 9, wherein determining the location of the security tag comprises determining the location of the security tag as the second midpoint in response to the selected number of the locating beacons being three.

11. The security system of claim 9, wherein, in response to the selected number of the locating beacons being n, where n>3, determining the location of the security tag comprises:
  after determining the second midpoint, setting m=3 and performing a loop procedure, the loop procedure comprising determining a $m^{th}$ midpoint between the $m-1^{th}$ midpoint and a locating beacon having a next lowest signal strength,
  if m<n−1, incrementing m by 1 and repeating the loop procedure until m=n−1,
  in response to m=n−1, determining the location of the security tag as the $n-1^{th}$ midpoint.

12. The security system of claim 9, wherein the processing circuitry is further configured to:
  repeat the tag position estimation at least x number of times;
  store x most recent determined locations of the security tag comprises; and
  determine an average tag position as an average of the x most recent determined locations.

13. The security system of claim 9, wherein defining the order further comprises weighting each locating beacon according to a ratio of signal strength and time received.

14. The security system of claim 13, wherein the processing circuitry is further configured to perform floor disambiguation in response to a determination that the security tag is being simultaneously tracked on more than one floor.

15. The security system of claim 14, wherein the floor disambiguation comprises comparing weights of locating beacons and differentiating between floors based on a floor having a highest locating beacon weight.

16. The security system of claim 9, wherein the signal strength is RSSI.

17. A method of performing tag position estimation for a security tag adapted to be disposed on a corresponding product in a monitoring environment, method comprising:
  receiving information indicative of signal strength measured at the security tag relative to each of a plurality of locating beacons disposed in the monitoring environment;
  defining an order of a selected number of the locating beacons based on signal strength;
  determining a first midpoint between two of the selected number of the locating beacons having the lowest signal strengths;
  determining at least a second midpoint between the first midpoint and a locating beacon having a next lowest signal strength; and
  determining a location of the security tag at least in part based on the second midpoint.

18. The method of claim 17, wherein determining the location of the security tag comprises determining the location of the security tag as the second midpoint in response to the selected number of the locating beacons being three.

19. The method of claim 17, wherein, in response to the selected number of the locating beacons being n, where n>3, determining the location of the security tag comprises:
  after determining the second midpoint, setting m=3 and performing a loop procedure, the loop procedure comprising determining a $m^{th}$ midpoint between the $m-1^{th}$ midpoint and a locating beacon having a next lowest signal strength,
  if m<n−1, incrementing m by 1 and repeating the loop procedure until m=n−1,
  in response to m=n−1, determining the location of the security tag as the $n-1^{th}$ midpoint.

20. The method of claim 17, further comprising:
  repeating the tag position estimation at least x number of times;
  storing x most recent determined locations of the security tag comprises; and
  determining an average tag position as an average of the x most recent determined locations.

* * * * *